United States Patent [19]

Zierden

[11] 4,131,132
[45] Dec. 26, 1978

[54] MOUNTING BRACKET ASSEMBLY

[75] Inventor: Frank P. Zierden, Oak Creek, Wis.

[73] Assignee: Zierden Company, Oak Creek, Wis.

[21] Appl. No.: 762,505

[22] Filed: Jan. 26, 1977

[51] Int. Cl.² .......................... B08B 3/02; F17D 1/14
[52] U.S. Cl. .................................. 137/615; 134/123; 403/316
[58] Field of Search ............... 137/615, 356, 357, 316; 15/DIG. 2; 248/323, 324, 289 R, 317, 204; 239/209, 185; 134/123; 285/23, 325; 403/316, 317

[56] References Cited

U.S. PATENT DOCUMENTS

| 624,423 | 5/1899 | Baird | 137/357 |
| 635,364 | 10/1899 | Utman | 137/357 |
| 3,265,087 | 8/1966 | Livingston | 239/209 |
| 3,356,102 | 12/1967 | Johnson | 239/209 |
| 3,643,988 | 2/1972 | Ingvartsen | 403/316 |
| 3,891,175 | 6/1975 | Hawley et al. | 248/317 |

OTHER PUBLICATIONS

Zierden Company, Overhead Wash Rack Swivel Safety Boom with Swing Extension Arm.

Primary Examiner—Martin P. Schwadron
Assistant Examiner—A. Michael Chambers
Attorney, Agent, or Firm—Thad F. Kryshak

[57] ABSTRACT

A mounting bracket assembly for releasably attaching a hose supporting boom to an overhead swivel cartridge of a car washing apparatus comprises a hinge plate adapted to be attached at one end to the rotatable outlet of the swivel cartridge, a boom body member from which the boom arm extends which body member has a hinge plate-receiving recess, compression means maintaining the hinge plate in the hinge plate recess of the boom body member and a jack which can be moved from an inoperative position to an operative position in which it is effective to maintain the compression means in a compressed state so that the boom assembly can be quickly detached from the hinge plate and the swivel cartridge can be replaced.

5 Claims, 7 Drawing Figures

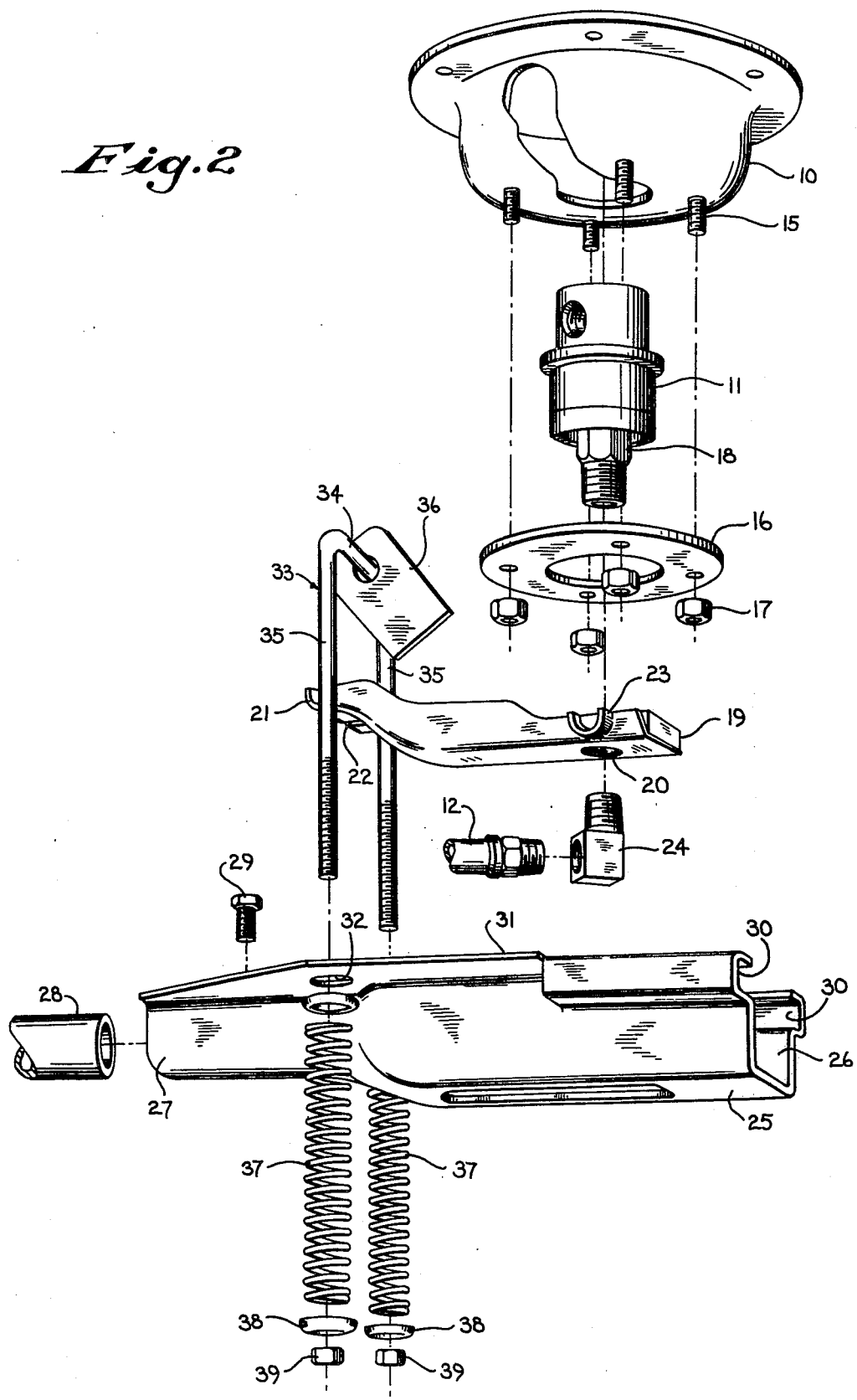

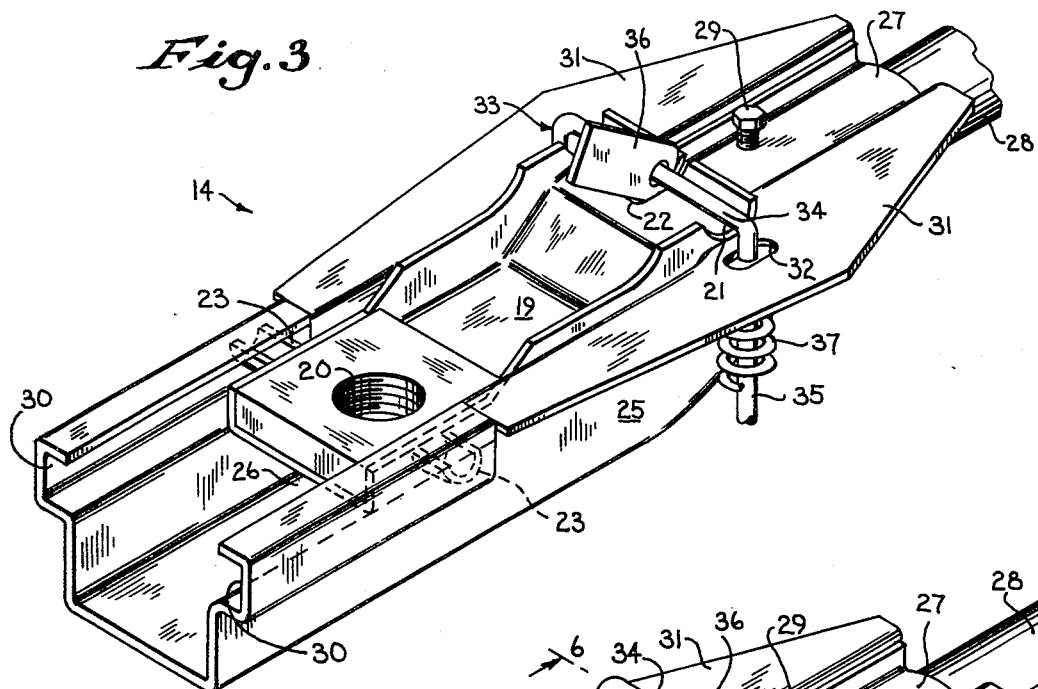
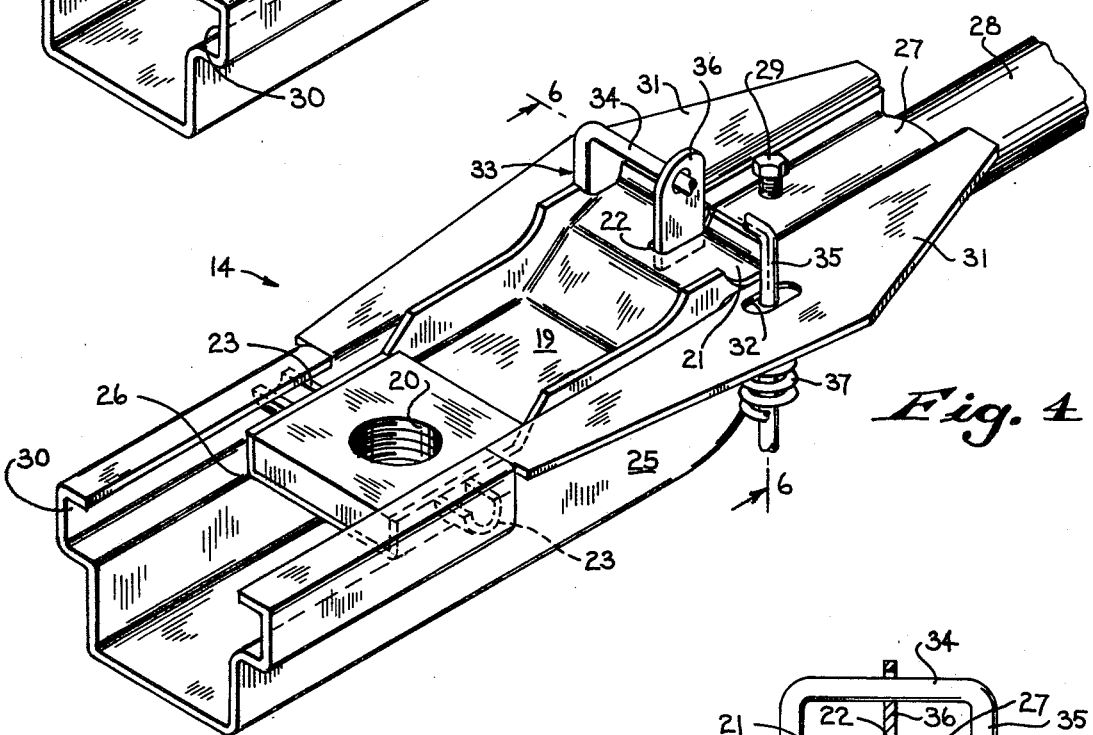
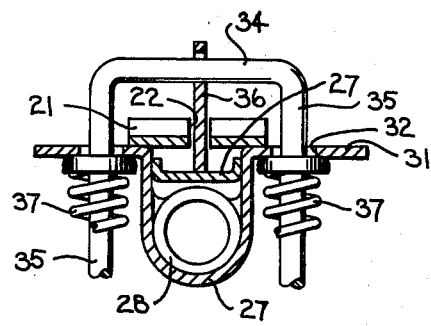
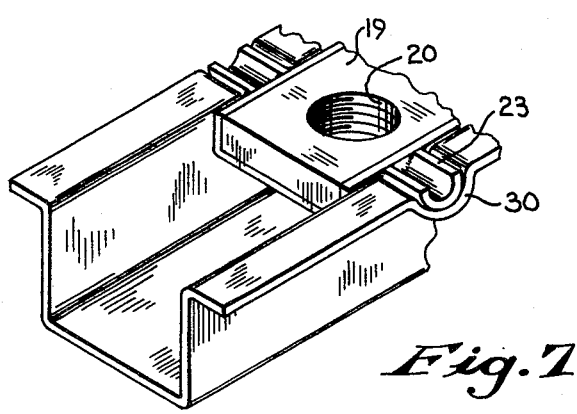

MOUNTING BRACKET ASSEMBLY

BACKGROUND OF THE INVENTION

There are a large number of car washing installations which utilize highly automated and expensive washing and drying machinery. However, there are also a large number of do-it-yourself or one-man-operated car washing installations which of necessity require simpler, less expensive car washing equipment. Many of such car washing installations utilize a relatively simple apparatus in which water flows through an overhead swivel cartridge to a car washing hose which is supported by a boom assembly attached to the rotatable outlet of the swivel cartridge so that the hose can be swung about 360° and the entire car can be washed without needing to pull the hose over or under the car. Such apparatus is not only inexpensive and efficient but also very dependable. However, on occasion, the swivel cartridge wears out and it must be replaced. Unfortunately, the replacement of the swivel cartridge normally requires practically a complete disassembly of the entire apparatus thus resulting in considerable downtime. There is a need, therefore, for a car washing apparatus of the type employing an overhead swivel cartridge in which the swivel cartridge can be easily and quickly replaced when needed.

SUMMARY OF THE INVENTION

It is the general object of the present invention to disclose a simple car washing mechanism having an overhead swivel cartridge and a boom for supporting a car washing hose in which the boom is attached to the swivel cartridge by a mounting bracket assembly which permits the boom to be quickly and easily detached from the swivel cartridge.

It is a further object of the present invention to disclose a novel mounting bracket assembly for releasably attaching a boom for a car washing hose to a replaceable swivel cartridge which not only allows the boom to be quickly detached but which also serves as a shock absorber that prevents the vertical movements of the boom arm from damaging the swivel cartridge and shortening its useful life.

The novel mounting bracket assembly of the present invention includes a hinge plate which is adapted to be attached to a swivel cartridge, a boom for supporting a car washing hose which includes a boom body having a hinge plate-receiving recess, compression means for maintaining the hinge plate and the boom body united with the hinge plate in the hinge plate-receiving recess and a jack which can be moved from an inoperative position to an operative position in which it is effective to maintain the compression means in a compressed state so that the boom can be quickly detached from the hinge plate and the swivel cartridge can be replaced.

In the preferred embodiment of the invention, the hinge plate is an elongated member which is attached at one end to the rotatable outlet of the swivel cartridge and is provided at the other end with an upwardly open hook portion. The body portion of the boom assembly is larger than the hinge plate and has a hinge plate-receiving recess to receive and cradle the hinge plate. The preferred compression means includes a U-bolt, U-bolt leg-receiving apertures in lateral flanges on the boom body, a pair of heavy compression springs adapted to be positioned about the legs of the U-bolt and means such as cup washers and hex bolts for retaining the heavy compression springs on the legs of the U-bolt. The U-bolt is positioned so that the base of the U-bolt lies in the open hook portion of the pivot plate, the legs of the bolt extend downwardly through apertures in the flanges of the boom body and the compression springs are positioned axially about the legs of the bolt between the bottom of the boom body and the threaded ends of the bolt legs. Each of the springs is retained in position by suitable means such as a cup washer and a hex nut. The force exerted by the compression springs on the bottom of the boom body keeps the base of the bolt in the hook portion of the hinge plate so that the hinge plate is retained in the recess of the boom body and the boom and the swivel outlet rotate horizontally together. A jack in the form of a rotatable plate is positioned on the base of the U-bolt. When it is desired to replace the swivel cartridge, the springs are compressed by pulling down on the boom arm and the jack is moved to the operative position in which it extends between the base of the U-bolt and the upper surface of the body member. When it is thus positioned, the springs are maintained in a compressed state and the boom assembly can be detached from the hinge plate. To insure proper positioning of the jack and to prevent the jack from being inadvertently released, a jack-receiving open end slot is provided in the hook end of the hinge plate.

When the swivel cartridge has been replaced and the hinge plate is attached to the outlet of the new swivel cartridge, the boom can be quickly reattached to the hinge plate by positioning the boom body so that the hinge plate is in the hinge plate-receiving recess and the U-bolt base is directly above the open hook portion of the hinge plate. The springs are then further compressed by moving the boom arm downwardly so that the jack is freed and can be rotated to an inoperative position. The boom arm is then released so that the compression springs prevent the hinge plate and the boom body from being separated.

In an especially preferred embodiment, the hinge plate is provided with trunion pins and the boom body has trunion-receiving recesses so that when the mounting bracket is fully assembled, any vertical movement of the boom arm will cause the boom body to pivot about the hinge plate without transferring a potentially destructive vertical force to the swivel cartridge.

The foregoing and other objects and advantages of the invention will appear from the description which follows. In that description reference is made to the accompanying drawings which form a part hereof and in which are shown by way of illustration and not limitation a preferred embodiment of the invention.

BRIEF DESCRIPTION OF THE DRAWINGS

FIG. 2 is an enlarged exploded view of the preferred embodiment of the swivel cartridge and mounting bracket assembly;

FIG. 3 is an enlarged view partially in section showing the mounting bracket assembly of FIG. 2 in assembled position;

FIG. 4 is an enlarged view partially in section showing the mounting bracket assembly of FIG. 3 with the jack in an operative position;

FIG. 6 is a sectional view taken along lines 6—6 of FIG. 4; and

FIG. 7 is an enlarged view partially in section showing another embodiment of the invention.

DESCRIPTION OF THE PREFERRED EMBODIMENT

Figure 1:
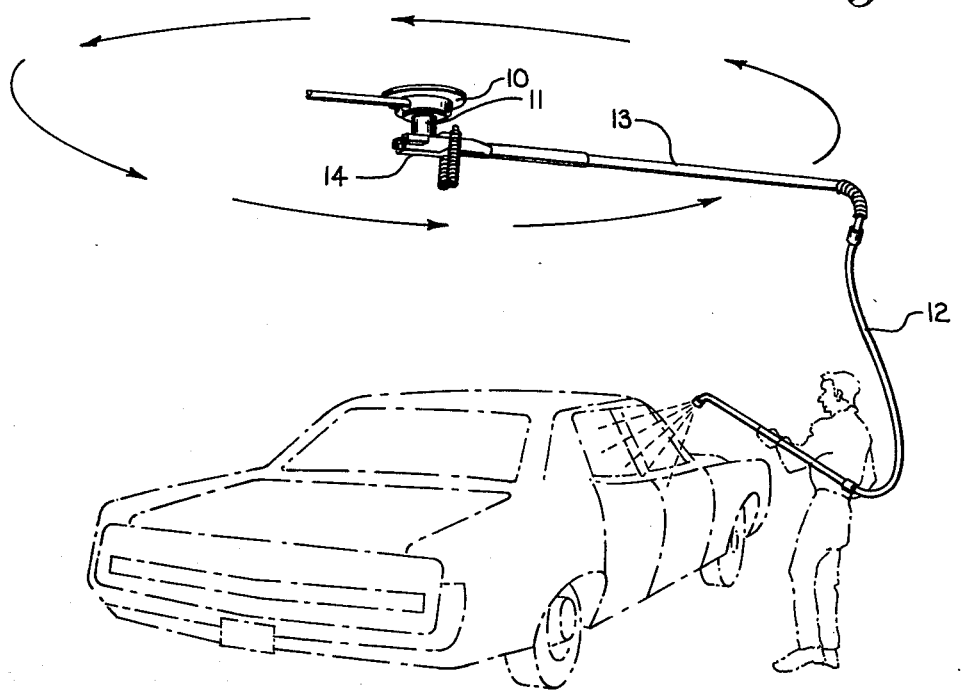
FIG. 1 is a schematic perspective view showing a car washing system including the present invention.

Referring now to FIG. 1, a car washing system includes a swivel base 10, a swivel cartridge 11 positioned in said base, a car washing hose 12, a boom 13 for said hose and a mounting bracket assembly 14 for attaching the boom assembly to the swivel cartridge.

In FIG. 2, there can be seen the individual components of the swivel and mounting bracket assemblies. As seen in FIG. 2, the swivel base 10 is provided with threaded means 15 which are adapted to cooperate with a cartridge retaining collar 16 and hex nuts 17 to retain the swivel cartridge 11 within the base 10. The swivel cartridge 11 has an outlet 18 which is internally and externally threaded. The mounting bracket assembly includes an elongated hinge plate 19 which is provided at one end with a threaded aperture 20 so that it can be connected to the external thread of the outlet 18. The other end of the hinge plate 19 is provided with an upwardly open hook portion 21 and an open end slot 22 which extends into the open hook portion 21. The hinge plate is provided with a pair of outwardly extending trunion pins 23 only one of which can be seen in FIG. 2. When the swivel cartridge 11 is secured within the base 10 by use of the collar 16 and the hex nuts 17, and the hinge plate 19 is attached to the outlet 18, a right angle hose fitting 24 is threadably engaged with the internal thread of the outlet 18 and the car washing hose 12 is attached.

The mounting bracket assembly also includes a boom body 25 having a hinge plate-receiving recess 26 at one end and a boom arm socket 27 at the other end. The boom arm 28 through which the hose 12 extends is retained in the boom arm socket 27 by the hex bolt 29 which cooperates with a threaded aperture (not seen) in the top of the boom body. The boom body 25 is also further provided with trunion pin-receiving means 30 and outwardly extending flanges 31 each of which is provided with an aperture 32. The mounting bracket assembly further includes a U-bolt 33 having a base 34 and a pair of downwardly depending legs 35, 35 with threaded ends, a jack plate 36 positioned on the U-bolt base 34, a pair of compression springs 37, 37 adapted to be positioned axially about U-bolt legs 35, 35 and a pair of cup washers 38, 38 and hex nuts 39, 39 adapted to maintain the compression springs 37 in position on the U-bolt legs.

Figure 5:
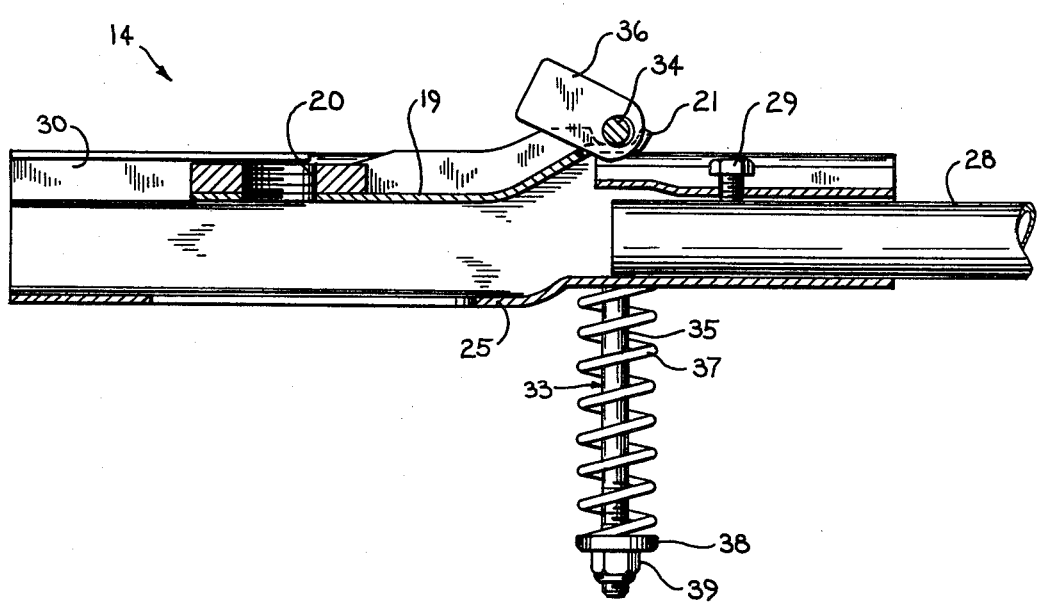
FIG. 5 is an enlarged side view of the mounting assembly shown in FIG. 3.

Turning now to FIGS. 3 and 5 in which the swivel cartridge and hose are not shown, it can be seen that when the preferred embodiment of the mounting bracket assembly is fully assembled, the hinge plate 19 is positioned in the hinge plate-receiving recess 26 in the boom body 25. The base 34 of the U-bolt 33 is positioned in the upwardly open hook portion 21 of the hinge plate 19 and the hinge plate and body 25 of the boom are maintained in that position by the action of the compression springs 37, 37 which are positioned about the legs 35, 35 of the U-bolt that extend through the apertures 32 in the flanges 31 and the trunion pins 23 which are positioned in the trunion pin-receiving means 30 in the boom body 25.

When properly assembled, the various components of the car washing assembly are as seen in FIG. 1 and the mounting bracket components are as seen in FIGS. 3 and 5. When the components are thus assembled, the swivel rotates horizontally with the boom assembly and vertical movements of the boom arm cause the boom body 25 to pivot about the trunion pins 23 of the hinge plate 19 so that the possibly destructive effects of such movements are not transferred to the swivel cartridge.

When the swivel cartridge 11 has to be replaced, the boom assembly can be quickly detached by pulling downward on the boom arm 28 so that the compressive springs 37, 37 are compressed still further so that the jack plate 36 can be swung from the inoperative position seen in FIGS. 3 and 5 to the operative position seen in FIGS. 4 and 6 in which it is positioned in the open end slot 22 in the free end of the hinge plate 19 between the U-bolt base 34 and the top of the boom body 25. When the jack plate 36 is in this position, the base 34 of the U-bolt is no longer cradled in the open hook 21 of the hinge plate 19, therefore, the boom assembly can be removed by moving it horizontally so that the base 34 of the U-bolt clears the open hook 21 of the hinge plate 19 and the trunion-receiving channels 30 are removed from about the trunion pins 23. The boom body assembly can then be swung aside and the hinge plate 19 and swivel cartridge 11 replaced.

Once the swivel cartridge has been replaced, the boom assembly can be quickly reattached by repositioning the hinge plate 19 in the hinge plate-receiving recess 26, placing the base 34 of the U-bolt 33 over the open hook 21 of the hinge plate 19 and positioning the trunion pins 23 in the trunion pin-receiving means 30. The boom arm 28 is then depressed to still further compress the springs 37 and the jack plate 36 swung back to the inoperative position seen in FIGS. 3 and 5. When the boom arm is released, the hinge plate 19 and boom body 25 are maintained together by the cooperative action of the U-bolt 33 and the compressive springs 37 and the trunion pins 23 and trunion pin-receiving channels 30.

The mounting bracket assembly of the present invention makes it possible for the replacement of the swivel cartridge to be performed quickly and by a single person thus significantly reducing the downtime normally involved in replacing the swivel cartridge.

Although a preferred embodiment has been described for purposes of illustration, the size and shapes of the components can be modified. For example, in FIG. 7, an alternative form of the trunion pin-receiving means is shown. If desired, the jack plate can be provided with a cut-out to receive the hook end portion of the hinge plate and the open end slot eliminated. In view of these and other possible modifications and changes, it is to be understood that such modifications and changes are intended to be included in the scope of the invention and that no limitations are to be placed upon the invention other than those set forth in the following claims.

I claim:

1. In a car washing apparatus in which water flows from an overhead swivel cartridge having a rotatable outlet to a car washing hose which is supported by a boom attached to the outlet, the improvement which comprises a mounting bracket assembly which permits the boom and hose to be rapidly and safely disconnected from the swivel cartridge, said mounting bracket assembly comprising:
 (a) a hinge plate adapted to be connected at one end to the rotatable outlet of the swivel cartridge,
 (b) a boom body member supporting a boom and a car washing hose, said body member having a hinge plate receiving recess, (c) compression means which exert a compressive force to retain the hinge plate in the hinge plate receiving recess of the boom body member, and (d) jack means operatively connected with the compression means, said jack means being movable from an inoperable position to an operative position in which the jack means relieves the compressive force of the compression means so that the boom body member, boom and car washing hose can be readily disconnected from the swivel cartridge.

2. The mounting bracket assembly of claim 1 in which the hinge plate is provided at the other end with an upwardly open hook, and the compression means includes a U-bolt which has a base which is positioned in the upwardly open hook and a pair of legs which extend below the boom body member, each of said legs having a compression spring positioned axially thereupon, said springs exerting a compressive force to retain the hinge plate in the hinge plate receiving recess of the boom body member.

3. The mounting bracket assembly of claim 1 in which the hinge plate and the boom body member are provided with co-acting trunion components so that the boom body can pivot vertically to a limited extent from the hinge plate.

4. A mounting bracket assembly for releasably attaching a boom and a hose to a rotatable outlet of an overhead swivel cartridge of a car washing apparatus which assembly comprises:

(a) a hinge plate adapted to be attached at one end to the rotatable outlet of the swivel cartridge, said hinge plate having at the other end an upwardly open hook, (b) a boom body member for supporting a boom and a hose, said boom body member having a hinge plate receiving recess, (c) compression means associated with said boom body said compression means including a U-bolt which has a base which is positioned in the upwardly open hook of the hinge plate and a pair of legs which extend below the boom body portion, each of said legs having a compression spring positioned axially thereupon which exerts a force to retain the U-bolt base in the open hook and the hinge plate in the hinge plate receiving recess of the boom body member and (d) a jack plate positioned upon the U-bolt base, said jack plate being movable from an inoperative position to an operative position in which it maintains the compression springs in an abnormal compressed state so that the U-bolt base can be removed from the open hook of the hinge plate and the boom body member can be separated from the hinge plate.

5. The mounting bracket assembly of claim 4 in which the open hook portion of the hinge plate is provided with an open end slot which receives the jack plate when it is in the operative position.

* * * * *